G. Pennoyer,

Harness Saddle.

No. 103,495.　　　　　　　Patented May 24, 1870.

United States Patent Office.

GEORGE PENNOYER, OF NEW YORK, N. Y.

Letters Patent No. 103,495, dated May 24, 1870.

IMPROVED HARNESS SADDLE-TREE.

The Schedule referred to in these Letters Patent and making part of the same.

*To all whom it may concern:*

Be it known that I, GEORGE PENNOYER, of New York city, in the county of New York and in the State of New York, have invented certain new and useful Improvements in Harness Saddle-Trees; and do hereby declare that the following is a full, clear, and exact description thereof, reference being had to the accompanying drawing making a part of this specification, in which—

Letters of like name and kind refer to like parts in each of the figures.

Figure 1:
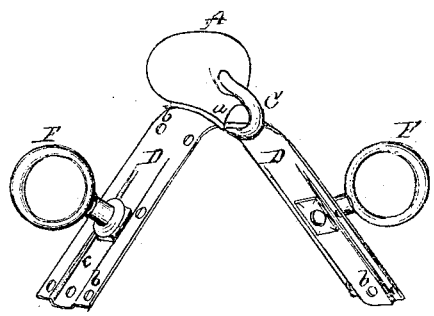
Figure 1 is a perspective view of my device.
Figure 2:
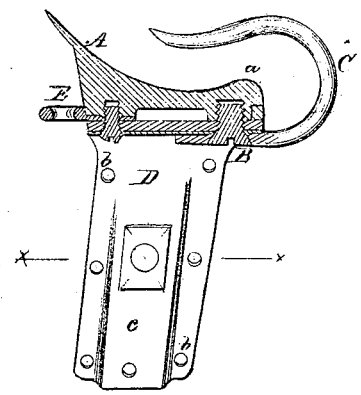
Figure 2 is a vertical central section of the same.
Figure 3:
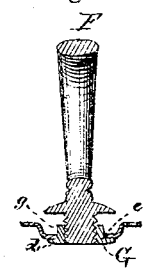
Figure 3 is a cross-section on the lines $x\ x$ and $y\ y$ respectively of figs. 1 and 2.

The invention relates to an improvement in gig-trees for harness-saddles, for the purpose of adding to their strength, durability, and convenience in working; and consists in trees in one piece, struck up in form out or sheet metal, provided with holes on the edges for the purpose of securing the covering and lining, and with rectangular openings for the reception of the nuts which secure the terrets, in combination with terrets provided with nuts of peculiar construction, so arranged that said nuts may be readily engaged with or disengaged from said trees, and when in position within the opening in the trees are prevented from turning when the terrets are turned; also, in the combination and arrangement of the several parts of the device, as more fully described below.

In the annexed drawing—

A represents a saddle cast solid in metal, having its front $a$ considerably raised above the seat, so as to afford a good bearing for the screw B, by which the hook C is fastened to the saddle.

The trees D are struck out in shape from thin sheet metal, and are provided with suitable holes $b$ along their edges for the purpose of securing the covering and lining together, and to the trees, with square holes for the reception of the terret-nuts, and with the usual channel $c$.

The back-band loop E is inserted in the usual place and in the usual manner.

The hook C is secured to the under side of the front of the saddle by the screw B, which passes up through the shank end of the hook, which is made flat for that purpose, and up into the front of the saddle, which is provided with a proper screw-thread.

The terrets F, of usual shape, are provided with screw-threads upon their feet, which enter into corresponding screw-threads in the nuts G, the terrets being inserted in the upper side of the trees, and the nuts in the lower sides of the same.

The nut G is rectangular at its base, where it is provided with shoulders $d$, which shoulders project on every side; and above the shoulders, upon its body $e$, is square or rectangular in form for a distance equal to or a little greater than the thickness of the metal of which the trees are composed. Above this point the neck of the nut $g$ is octagonal or cylindrical in form.

By means of this peculiarity in the shape of the nut G, when it is in position, it is held fast from turning when the terrets are turned, while the octagonal or cylindrical portion of it will not cut the leather placed over this portion of it. The trees are covered, lined, and padded in the usual way.

The advantages of my invention are found in the neatness of the manufactured article, exposing no bolt-heads or nuts to view, in the strength secured by the peculiar method of fastening the hook, in the great convenience and security given to the terrets by the use of the nut described and the manner by which it is held in place, and in the great strength, elasticity, and cheapness of construction of the trees.

Having thus set out the nature and merits of my improvements,

What I claim as my invention, and desire to secure by Letters Patent, is—

1. The trees D, in one piece, struck up out of sheet metal into the shape described and shown, and provided with holes $b$, and with rectangular openings for the reception of the terret-nuts G, in combination with the terrets F and terret-nuts G, provided with shoulders $d$, rectangular body $e$, and neck $g$, when constructed as described and shown, and for the purpose set forth.

2. The gig-tree above described, consisting of the saddle A, provided with the front $a$, the screw B, the hook C, back-band loop E, trees D, provided with holes on their edges and rectangular openings for the terret-nuts, the terrets F, the nuts G, provided with shoulders $d$, and body $e$, and neck $g$, when said several parts are constructed and arranged as described, and for the purpose set forth.

In testimony that I claim the foregoing, I have hereunto set my hand this 28th day of March, 1870.

GEO. PENNOYER.

Witnesses:
GEO. S. PRINDLE,
SAML. J. MARR.